(12) United States Patent
Varadarajan et al.

(10) Patent No.: US 12,555,227 B2
(45) Date of Patent: Feb. 17, 2026

(54) DETERMINING A CLINICAL PARAMETER VIA EVALUATION OF SEQUENTIAL MEDICAL IMAGES

(71) Applicant: THE GENERAL HOSPITAL CORPORATION, Boston, MA (US)

(72) Inventors: Kartik Mangudi Varadarajan, Acton, MA (US); Alireza Borjali, Somerville, MA (US); Orhun K. Muratoglu, Cambridge, MA (US)

(73) Assignee: THE GENERAL HOSPITAL CORPORATION, Boston, MA (US)

( * ) Notice: Subject to any disclaimer, the term of this patent is extended or adjusted under 35 U.S.C. 154(b) by 358 days.

(21) Appl. No.: 18/015,021

(22) PCT Filed: Jul. 7, 2021

(86) PCT No.: PCT/US2021/040702
§ 371 (c)(1),
(2) Date: Jan. 6, 2023

(87) PCT Pub. No.: WO2022/011023
PCT Pub. Date: Jan. 13, 2022

(65) Prior Publication Data
US 2023/0260113 A1    Aug. 17, 2023
US 2025/0069216 A2    Feb. 27, 2025

Related U.S. Application Data

(60) Provisional application No. 63/048,803, filed on Jul. 7, 2020.

(51) Int. Cl.
*G06T 7/00*   (2017.01)
*G06T 5/50*   (2006.01)
(Continued)

(52) U.S. Cl.
CPC .............. *G06T 7/0012* (2013.01); *G06T 5/50* (2013.01); *G16H 20/00* (2018.01); *G16H 50/20* (2018.01);
(Continued)

(58) Field of Classification Search
CPC .................... G06T 7/0012; G06T 5/50; G06T 2207/10081; G06T 2207/10088;
(Continued)

(56) References Cited

U.S. PATENT DOCUMENTS 11,100,647 B2 *   8/2021   Nikolov .................. A61B 6/501
2019/0223725 A1 *   7/2019   Lu .......................... G06N 3/044

OTHER PUBLICATIONS

NPL: Results Publication Date Range: Feb. 1, 2018 to Sep. 9, 2025.*

* cited by examiner

*Primary Examiner* — Quang N Vo
(74) *Attorney, Agent, or Firm* — Tarolli, Sundheim, Covell & Tummino LLP (57) ABSTRACT

Systems and methods are provided for determining a clinical parameter via evaluation of sequential medical images. A sequence of at least three medical images for a patient are captured at a scanner. A set of at least two difference images are generated from the sequence of at least three medical images. Each difference image represents a difference in content between two adjacent images in the sequence of at least three medical images. The set of at least two difference images are provided to a predictive model. The predictive model includes an artificial neural network having at least one convolutional layer. A clinical parameter for the patient is determined at the predictive model from at least the set of at least two difference images.

20 Claims, 3 Drawing Sheets

(51) Int. Cl.
*G16H 20/00* (2018.01)
*G16H 50/20* (2018.01)

(52) U.S. Cl.
CPC ............... *G06T 2207/10081* (2013.01); *G06T 2207/10088* (2013.01); *G06T 2207/20084* (2013.01); *G06T 2207/20221* (2013.01)

(58) Field of Classification Search
CPC .......... G06T 2207/20084; G06T 2207/20221; G16H 50/20; G16H 20/00
USPC ........................................................ 382/128
See application file for complete search history.

DETERMINING A CLINICAL PARAMETER VIA EVALUATION OF SEQUENTIAL MEDICAL IMAGES

RELATED APPLICATIONS

This application claims priority from U.S. Provisional Application No. 63/048,803, filed 7 Jul. 2020, and entitled "DETERMINING A CLINICAL PARAMETER VIA EVALUATION OF SEQUENTIAL MEDICAL IMAGES," the subject matter of which is incorporated herein by reference in its entirety.

TECHNICAL FIELD

This invention relates to medical imaging, and more specifically, to determination of a clinical parameter via evaluation of sequential medical images.

BACKGROUND

Deep learning is part of a broader family of machine learning methods based on artificial neural networks with representation learning. Deep learning techniques can be supervised, semi-supervised or unsupervised. The adjective "deep" in deep learning refers to the use of multiple layers in the network. Deep learning is a modern variation of neural networks which is concerned with an unbounded number of layers of bounded size, which permits practical application and optimized implementation, while retaining theoretical universality under mild conditions. In deep learning the layers are also permitted to be heterogeneous and to deviate widely from biologically informed connectionist models, for the sake of efficiency, trainability, and understandability.

SUMMARY

In one example, a method includes capturing a sequence of at least three medical images for a patient at a scanner and generating a set of at least two difference images from the sequence of at least three medical images. Each difference image represents a difference in content between two adjacent images in the sequence of at least three medical images. The set of at least two difference images are provided to a predictive model. The predictive model includes an artificial neural network having at least one convolutional layer. A clinical parameter for the patient is determined at the predictive model from at least the set of at least two difference images.

In another example, a system includes a processor and a non-transitory computer readable medium storing executable instructions executable by the processor to provide a scanner interface that receives a sequence of at least three medical images representing a subject and an image differencing component that generates a set of at least two difference images from the sequence of at least three medical images. Each difference image represents a difference in content between two adjacent images in the sequence of at least three medical images. A predictive model includes an artificial neural network having at least one convolutional layer and determines a clinical parameter for the subject from at least the set of at least two difference images.

In a further example, a method includes capturing a sequence of at least three medical images for a patient at a scanner and generating a set of at least two difference images from the sequence of at least three medical images. Each difference image represents a difference in content between two adjacent images in the sequence of at least three medical images. The set of at least two difference images is provided to a predictive model, that includes a plurality of convolutional networks and an arbitrator. A clinical parameter is determined for the patient at the arbitrator from respective outputs of the plurality of convolutional neural networks

DETAILED DESCRIPTION

A "clinical parameter," as used herein, is any continuous, ordinal, or categorical parameter that represents a current or predicted future medical condition of a patient, and can include any value representing diagnosis of disease or injury or predicting a patient outcome.

As used herein, a "predictive model" is a mathematical model that either predicts a future state of a parameter or estimates a current state of a parameter that cannot be directly measured or for which direct measurement is impractical.

A "convolutional neural network," as used herein, is any artificial neural network having at least one convolutional layer.

A "sequence of medical images," as used herein, can include any of a time series of two-dimensional images, a three-dimensional image comprises of a sequence of spatially proximate two-dimensional slices, or a time series of three-dimensional images.

Two machine learning models are "independent" when they do not directly or indirectly influence each other's output.

As used herein, the term "subject" can refer to any warm-blooded organism including, but not limited to, a human being, a pig, a rat, a mouse, a dog, a cat, a goat, a sheep, a horse, a monkey, an ape, a rabbit, a cow, etc. The terms "patient", "user", and "subject" can be used interchangeably herein.

Systems and methods provided herein utilize a deep learning (DL) model for analysis of sequential medical images. As used herein, sequential medical images can include magnetic resonance imaging (MRI) and computed tomography (CT) scans, which consist of a stack or series of image slices, or images collected longitudinally in time, for example plain radiographs (x-rays) of patients collected at different timepoints or during follow-up visits. The proposed DL model uses the changes between successive sequential images, expressed as difference images, as inputs to a convolutional neural network to improve model performance. In some examples, the sequence of medical images represents orthopedic imaging of the hip, knee, shoulder, foot, ankle, wrist, hand, spine or other region of interest, and the clinical parameter represents a diagnosis of soft-tissue injuries, bone fractures, fracture healing, osteoarthritis detection, cartilage defect identification, or similar condition.

Figure 1:
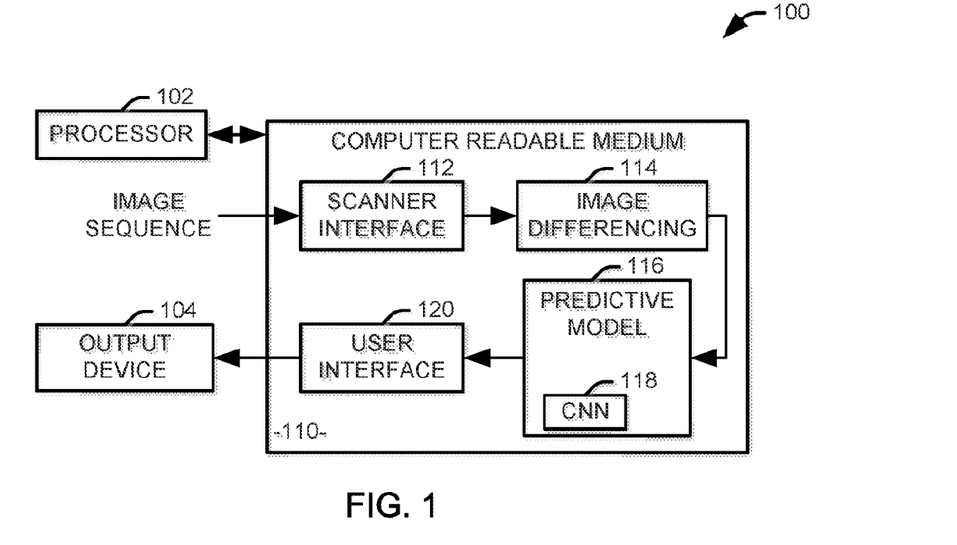
FIG. 1 illustrates an example of a system for determining a clinical parameter via evaluation of sequential medical images.

FIG. 1 illustrates a system 100 for determining a clinical parameter via evaluation of sequential medical images in accordance with an aspect of the present invention. The system 100 includes a processor 102, an output device 104, and a non-transitory computer readable medium 110 storing machine executable instructions that can be executed by the processor to perform various functions. The machine executable instructions include, for example, a image interface 112 that is configured to receive a sequence of medical images from a medical scanner (not shown), a remote system storing medical images, or a local storage medium. Depending on the source of the images, the image interface 112 can include, for example, software for interacting with appropriate hardware for implementing a bus or network connection with the source of the sequence of images.

The received sequence of images is then provided to an image differencing component 114. The image difference component 114 generates, for each pair of adjacent images in the sequence of medical images, a difference image representing the changes between the two images in the sequence. Accordingly, a series of N images will result in a set of N-1 difference images. In one example, the image differencing component 114 can include appropriate software instructions for registering a pair of images as well as appropriate instructions for generating a difference image as a pixel-by-pixel subtraction of color or grayscale values between the registered images. In practice, the sequence of medical images will comprise at least three images, such that the set of difference images includes a plurality of difference images.

A predictive model 116 includes at least a convolutional neural network 118 that receives the set of difference images. In one implementation, an output of the convolutional neural network 118 is the clinical parameter. In another implementation, the convolutional neural network 118 is one of a plurality of independent convolutional neural networks that each receive one of the set of difference images and provide a clinical parameter to an arbitrator to select a final clinical parameter via an arbitration scheme. In one example, an average (e.g., mean, median, or mode) of the clinical parameters provided by the plurality of convolutional neural networks is provided as the final output. In another example, the plurality of convolutional neural networks each provide a continuous value, and an extremum of the values is selected as the final output. In still another example, the plurality of convolutional neural networks each provide a categorical or a continuous value, and the arbitrator can assign a final categorical parameter according to a set of logical rules. It will be appreciated that the implementation of the arbitrator can vary with the specific implementation, and that the examples provided herein are not exhaustive.

In still another implementation, one or more convolutional neural networks each receive one or more of the set of difference images and provides an array of values, for example, the output of a pooling layer of the convolutional neural network. These features can be provided to another machine learning model that is part of the predictive model 116. In practice, the other machine learning model can utilize additional parameters as part of assigning the clinical parameter, including, for example, demographic data (e.g., age, sex, home zip code), genomic data, nutritional information, medication intake, household information (e.g., type of home, number and age of residents), biometric parameters (e.g., weight, height, blood pressure, blood glucose, etc.), and relevant medical history. It will be appreciated that the relevant additional parameters will vary with the implementation, and that the examples provided herein are not exhaustive.

The additional machine learning model can utilize one or more pattern recognition algorithms, each of which analyze some or all of the features provided by the one or more convolutional neural networks to assign the clinical parameter to the user. The training process of a given pattern recognition algorithm will vary with its implementation, but training generally involves a statistical aggregation of training data into one or more parameters associated with the output class or parameter. For rule-based models, such as decision trees, domain knowledge, for example, as provided by one or more human experts, can be used in place of or to supplement training data in selecting rules for classifying a user using the extracted features. Any of a variety of techniques can be utilized for the classification algorithm, including support vector machines, regression models, self-organized maps, fuzzy logic systems, data fusion processes, boosting and bagging methods, rule-based systems, or artificial neural networks.

For example, an SVM classifier can utilize a plurality of functions, referred to as hyperplanes, to conceptually divide boundaries in the N-dimensional feature space, where each of the N dimensions represents one associated feature of the feature vector. The boundaries define a range of feature values associated with each class. Accordingly, an output class and an associated confidence value can be determined for a given input feature vector according to its position in feature space relative to the boundaries. In one implementation, the SVM can be implemented via a kernel method using a linear or non-linear kernel.

An ANN classifier comprises a plurality of nodes having a plurality of interconnections. The values from the feature vector are provided to a plurality of input nodes. The input nodes each provide these input values to layers of one or more intermediate nodes. A given intermediate node receives one or more output values from previous nodes. The received values are weighted according to a series of weights established during the training of the classifier. An intermediate node translates its received values into a single output according to a transfer function at the node. For example, the intermediate node can sum the received values and subject the sum to a binary step function. A final layer of nodes provides the confidence values for the output classes of the ANN, with each node having an associated value representing a confidence for one of the associated output classes of the classifier.

Many ANN classifiers are fully-connected and feedforward. A convolutional neural network, however, includes convolutional layers in which nodes from a previous layer are only connected to a subset of the nodes in the convolutional layer. Recurrent neural networks are a class of neural networks in which connections between nodes form a directed graph along a temporal sequence. Unlike a feedforward network, recurrent neural networks can incorporate feedback from states caused by earlier inputs, such that an output of the recurrent neural network for a given input can be a function of not only the input but one or more previous inputs. As an example, Long Short-Term Memory (LSTM) networks are a modified version of recurrent neural networks, which makes it easier to remember past data in memory.

A rule-based classifier applies a set of logical rules to the extracted features to select an output class. Generally, the rules are applied in order, with the logical result at each step influencing the analysis at later steps. The specific rules and their sequence can be determined from any or all of training data, analogical reasoning from previous cases, or existing domain knowledge. One example of a rule-based classifier is a decision tree algorithm, in which the values of features in a feature set are compared to corresponding threshold in a hierarchical tree structure to select a class for the feature vector. A random forest classifier is a modification of the decision tree algorithm using a bootstrap aggregating, or "bagging" approach. In this approach, multiple decision trees are trained on random samples of the training set, and an average (e.g., mean, median, or mode) result across the plurality of decision trees is returned. For a classification task, the result from each tree would be categorical, and thus a modal outcome can be used. The resulting clinical parameter can then be provided to a user at the output device 104 via a user interface.

Figure 2:
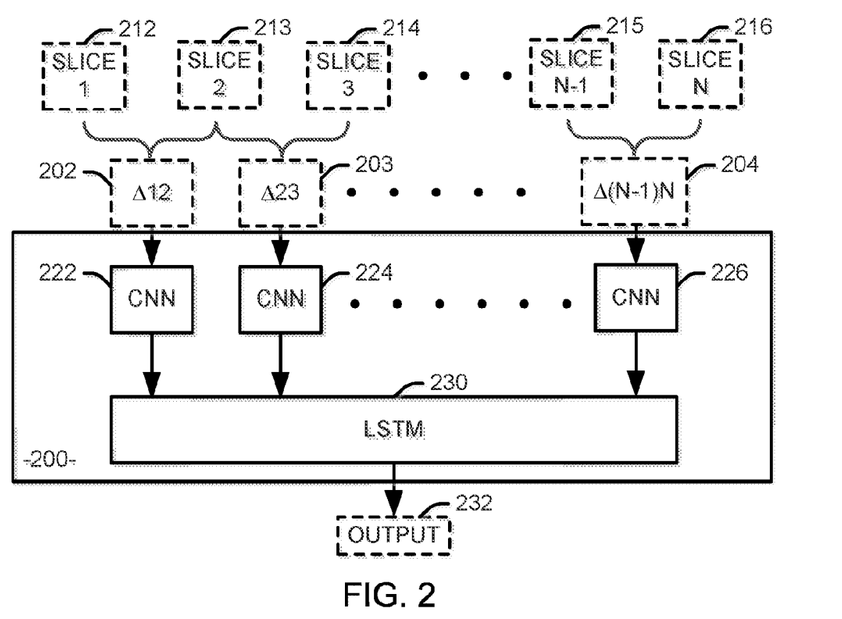
FIG. 2 illustrates a predictive model that can be used in a system for determining a clinical parameter via evaluation of sequential medical images.

In one implementation, the additional machine learning model is implemented as a recurrent neural network, such as a long, short term memory network. A plurality of convolutional neural networks each provide the output of a pooling layer to the recurrent neural network as a set of features, and the recurrent neural network provides the clinical parameter based upon the received sets of features. FIG. 2 illustrates a predictive model 200 that can be used in a system for determining a clinical parameter via evaluation of sequential medical images. The predictive model 200 is configured to receive a set of difference images 202-204 that are generated from a sequence of medical images 212-216. In the illustrated implementation, the difference images 202-204 are generated as a pixel-by-pixel subtraction between a pair of images, such that an difference image, $\Delta(i-1)i$, is the result of the pixel-by-pixel subtraction of an $(i-1)^{th}$ image from an $i^{th}$ image.

Each difference image 202-204 is provided to one of a plurality of convolutional neural networks 222, 224, and 226. Each convolutional neural network 222, 224, and 226 is used to extract features from each input independently. One or more of the convolutional neural networks can be implemented as a pre-trained model, with the weights of some or all of the links within each convolutional neural network set using link weights from an existing model via transfer learning. The values of final pooling layer of each convolutional neural network 222, 224, and 226 are provided as inputs to a long short-term memory (LSTM) network 230 that provides the clinical parameter.

Long short-term memory networks are a special kind of recurrent neural networks that are capable of selectively remembering patterns for long duration of time. The long-term memory is called the cell state, and the cell state is controlled by a set of gates including an input gate, an output gate, and a forget gate. A forget gate placed below the cell state is used to modify the cell states. The forget gate outputs values indicating which information to forget by multiplying zero to a position in the matrix. If the output of the forget gate is one, the information is kept in the cell. Input gates determine which information should enter the cell states. Finally, the output gate determines which information should be passed on to the next hidden state of the network. The output 232 of the long short-term memory network 230 can either be the clinical parameter or the clinical parameter can be a function of the output 232. Where the clinical parameter is categorical, it can represent the current presence or absence of a disease, injury, or other medical condition, a predicted presence or absence of a disease, injury, or other medical condition, a change in the condition of the subject, a predicted change in the condition of the subject, or a similar parameter representing the health of the subject. Where the clinical parameter is categorical, it can represent a predicted or estimated value for as biometric parameter, a predicted or estimated value for as biometric parameter, or a likelihood associated with one of the categorical labels.

To demonstrate the benefits of the novel differential CNN-LSTM model of FIG. 2, the model was applied to the task of diagnosing tibiofibular syndesmosis instability. Both a conventional deep learning system and the differential CNN-LSTM were utilized. The two models were trained on retrospective data composed of bilateral computed tomography images of stable and unstable tibiofibular syndesmosis including regions approximately five centimeters proximal to the tibial plafond. The dataset consisted of CT images for forty-eight patients with unstable joint, and ninety-six patients with stable joints. The "ground truth" labels (stable/unstable) were assigned to the images based on intraoperative confirmation of joint stability. The dataset was split into training, validation, and test subsets in 80:10:10 ratio. The training subset was used to train model parameters, the validation subset was used to optimize model hyperparameters, while the test subset was held-out and not presented to the model during training. The test subset was used only after model training was completed, to assess model performance. Accuracy of the two models was compared to that of the "ground truth" labels to quantify the performance of the models on the binary task of classifying a given CT image set as either a "stable" or "unstable" joint. The conventional model was able to diagnose joint stability with 86.6% accuracy on the test subset, while the differential CNN-LSTM achieved an accuracy of 93.3%.

Figure 3:
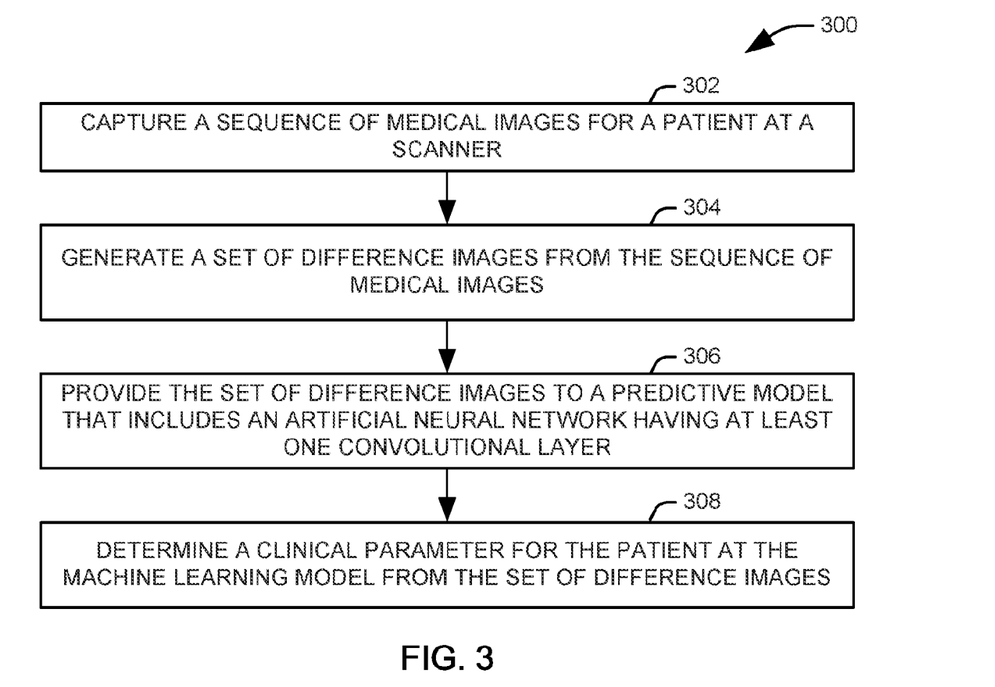
FIG. 3 illustrates one example of a method for determining a clinical parameter via evaluation of sequential medical images.
Figure 4:
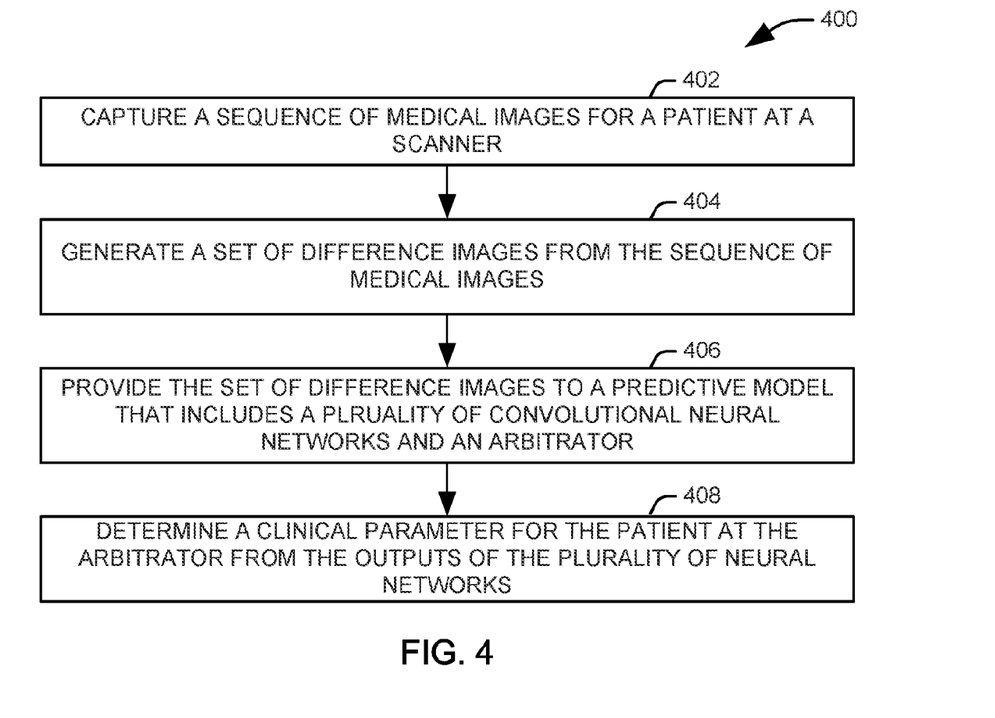
FIG. 4 illustrates another example of a method for determining a clinical parameter via evaluation of sequential medical images.

In view of the foregoing structural and functional features described above in FIGS. 1 and 2, an example method will be better appreciated with reference to FIGS. 3 and 4. While, for purposes of simplicity of explanation, the method of FIGS. 3 and 4 are shown and described as executing serially, it is to be understood and appreciated that the present invention is not limited by the illustrated order, as some actions could in other examples occur in different orders and/or concurrently from that shown and described herein.

FIG. 3 illustrates one example of a method 300 for determining a clinical parameter via evaluation of sequential medical images in accordance with an aspect of the present invention. At 302, a sequence of at least three medical images for a patient is captured at a scanner. It will be appreciated that the sequence of medical images can be stored in a computer readable medium between the capture of the images at 302 and the subsequent steps of the method. Further, the sequence of medical images can be captured at different times and, optionally, from different scanner devices. In one example, the sequence of at least three medical images represents a series of cross-sectional slices of a three-dimensional medical image, for example, from a computed tomography or magnetic resonance imaging scan. In another implementation, the sequence of at least three medical images represents a time series of two-dimensional medical images.

At 304, a set of at least two difference images is generated from the sequence of at least three medical images. Each difference image represents a difference in content between two adjacent images in the sequence of at least three medical images. The difference images can be generated by any appropriate means, but in one implementation, adjacent pairs of images in the sequence of medical images are registered to align the images, and a pixel-by-pixel subtraction of color or grayscale (e.g., brightness) values within the image is conducted to provide the difference image. At 306, the set of at least two difference images to a predictive model. The predictive model includes an artificial neural network having at least one convolutional layer. At 308, a clinical parameter for the patient is determined at the predictive model from at least the set of at least two difference images.

In one example, the predictive model comprises multiple independent convolutional neural networks, which each receive one of the set of difference images as an input. In this example, the output of each of the multiple convolutional neural networks is provided to either an arbitrator or another machine learning algorithm to provide the clinical parameter. For example, each of the convolutional neural networks can provide their outputs as a set of features to an artificial neural network, such as a recurrent neural network, that determines the clinical parameter according to at least the provided set of features. The output of each convolutional neural network can be, for example, an array of values from a convolutional or pooling layer of the convolutional neural network.

FIG. 4 illustrates another example of a method 400 for determining a clinical parameter via evaluation of sequential medical images in accordance with an aspect of the present invention. At 402, a sequence of at least three medical images for a patient is captured at a scanner. It will be appreciated that the scanner can sequence of images can be either or both of a spatial sequence, for example, as a series of image slices produced by a computed tomography or magnetic resonance imaging scanner, or a temporal series of images. At 404, a set of at least two difference images is generated from the sequence of at least three medical images. Each difference image represents a difference in content between two adjacent images in the sequence of at least three medical images. In one example, the difference images can be acquired by taking a pixel-by-pixel subtraction of chromatic or brightness values associated with each pixel.

At 406, the set of at least two difference images are to a predictive model comprising a plurality of convolutional networks and an arbitrator. The output of each of the plurality of convolutional neural networks is provided to the arbitrator, and at 408, the arbitrator provides a clinical parameter for the patient from respective outputs of the plurality of convolutional neural networks. In one implementation, each convolutional neural network receives a different difference image, and the predictive model can be designed such that there is a one-to-one correspondence between the number of difference images produced in a typical scan (e.g., one less than the number of slices), and the number of convolutional neural networks, such that all of the difference images are used without repetition across the plurality of convolutional neural networks.

In one example, the arbitrator simply selects a class that the majority of the convolutional neural networks had selected. In another example, the arbitrator is another machine learning system, such as an artificial neural network, that accepts the output of the convolutional neural networks as features. In one implementation, the machine learning model is a recurrent neural network. Once the arbitrator has assigned the clinical parameter, it can be stored in a non-transitory computer readable medium, displayed to a user, or used to assign a course of treatment to the subject.

Figure 5:
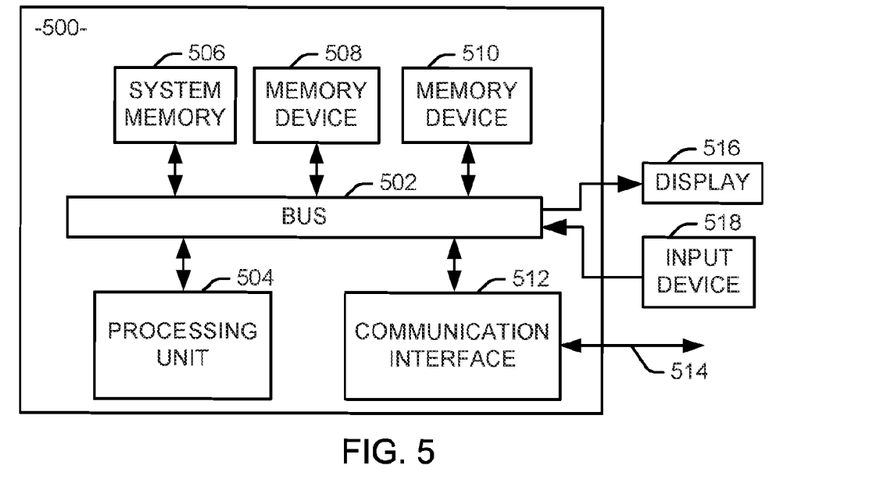
FIG. 5 is a schematic block diagram illustrating an exemplary system of hardware components.

FIG. 5 is a schematic block diagram illustrating an exemplary system 500 of hardware components capable of implementing examples of the systems and methods disclosed herein. The system 500 can include various systems and subsystems. The system 500 can be a personal computer, a laptop computer, a workstation, a computer system, an appliance, an application-specific integrated circuit (ASIC), a server, a server BladeCenter, a server farm, etc.

The system 500 can include a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard, touch screen, and/or a mouse). The system bus 502 can be in communication with the processing unit 504 and the system memory 506. The additional memory devices 508 and 510, such as a hard disk drive, server, standalone database, or other non-volatile memory, can also be in communication with the system bus 502. The system bus 502 interconnects the processing unit 504, the memory devices 506-510, the communication interface 512, the display 516, and the input device 518. In some examples, the system bus 502 also interconnects an additional port (not shown), such as a universal serial bus (USB) port.

The processing unit 504 can be a computing device and can include an application-specific integrated circuit (ASIC). The processing unit 504 executes a set of instructions to implement the operations of examples disclosed herein. The processing unit can include a processing core.

The additional memory devices 506, 508, and 510 can store data, programs, instructions, database queries in text or compiled form, and any other information that may be needed to operate a computer. The memories 506, 508 and 510 can be implemented as computer-readable media (integrated or removable), such as a memory card, disk drive, compact disk (CD), or server accessible over a network. In certain examples, the memories 506, 508 and 510 can comprise text, images, video, and/or audio, portions of which can be available in formats comprehensible to human beings.

Additionally or alternatively, the system 500 can access an external data source or query source through the communication interface 512, which can communicate with the system bus 502 and the communication link 514.

In operation, the system 500 can be used to implement one or more parts of a system for determining a clinical parameter via evaluation of sequential medical images in accordance with the present invention. Computer executable logic for implementing the system resides on one or more of the system memory 506, and the memory devices 508 and 510 in accordance with certain examples. The processing unit 504 executes one or more computer executable instructions originating from the system memory 506 and the memory devices 508 and 510. The term "computer readable medium" as used herein refers to a medium that participates in providing instructions to the processing unit 504 for execution. This medium may be distributed across multiple discrete assemblies all operatively connected to a common processor or set of related processors. Specific details are given in the above description to provide a thorough understanding of the embodiments. However, it is understood that the embodiments can be practiced without these specific details. For example, physical components can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps, and means described above can be done in various ways. For example, these techniques, blocks, steps, and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method comprising:
    capturing a sequence of at least three medical images for a patient at a scanner;
    generating a set of at least two difference images from the sequence of at least three medical images, each difference image representing a difference in content between two adjacent images in the sequence of at least three medical images;
    providing the set of at least two difference images to a predictive model, the predictive model comprising an artificial neural network having at least one convolutional layer; and
    determining a clinical parameter for the patient at the predictive model from at least the set of at least two difference images.

2. The method of claim 1, wherein a first difference image of the set of at least two difference images is provided to a first convolutional neural network of the predictive model and a second difference image of the set of at least two difference images is provided to a second convolutional neural network of the predictive model, wherein the first convolutional neural network is independent of the second convolutional neural network.

3. The method of claim 2, wherein the outputs of the first convolutional neural network and the second convolutional neural network are provided to an arbitrator that provides the clinical parameter from the outputs of the first convolutional neural network and the second convolutional neural network.

4. The method of claim 2, wherein each of the first convolutional neural network and the second convolutional neural network provide respective first and second outputs as a set of features to a machine learning model, the machine learning model determining the clinical parameter according to at least the provided set of features.

5. The method of claim 4, wherein the machine learning model is a recurrent neural network.

6. The method of claim 2, in which the first convolutional neural network receives a first difference image of the at least two difference images as an input and the second convolutional neural network receives a second difference image of the at least two difference images as an input.

7. The method of claim 1, wherein the sequence of at least three medical images represents a series of cross-sectional slices of a three-dimensional medical image.

8. The method of claim 1, wherein the sequence of at least three medical images represents a time series of medical images.

9. The system of claim 8, further comprising a magnetic resonance imaging (MRI) system that provides the sequence of at least three medical images to the imager interface as a series of cross-sectional slices of a three-dimensional MRI image.

10. The system of claim 8, further comprising a computed tomograph (CT) system that provides the sequence of at least three medical images to the imager interface as a series of cross-sectional slices of a three-dimensional CT image.

11. The system of claim 8, wherein the sequence of at least three medical images represents a time series of medical images.

12. A system comprising:
a processor; and
a non-transitory computer readable medium storing executable instructions, the executable instructions comprising:
  a scanner interface that receives a sequence of at least three medical images representing a subject;
  an image differencing component that generates a set of at least two difference images from the sequence of at least three medical images, each difference image representing a difference in content between two adjacent images in the sequence of at least three medical images; and
  a predictive model, comprising an artificial neural network having at least one convolutional layer, that determines a clinical parameter for the subject from at least the set of at least two difference images.

13. The system of claim 12, wherein the predictive model comprises a plurality of convolutional neural networks, each of the plurality of convolutional neural networks being independent of the other of the plurality of convolutional neural networks, and an arbitrator that provides the clinical parameter from the outputs of the plurality of convolutional neural networks.

14. The system of claim 13, wherein the arbitrator comprises an artificial neural network, each of the plurality of convolutional neural networks providing an output as a set of features to the artificial neural network, the artificial neural network determining the clinical parameter according to at least the sets of features provided by the plurality of neural networks.

15. The system of claim 13, wherein each of the plurality of convolutional neural networks receives, as an input, a difference image of the set of at least two images, each of the plurality of convolutional neural networks receiving a different difference image than each of the other of the plurality of convolutional neural networks.

16. A method comprising:
capturing a sequence of at least three medical images for a patient at a scanner;
generating a set of at least two difference images from the sequence of at least three medical images, each difference image representing a difference in content between two adjacent images in the sequence of at least three medical images; and
providing the set of at least two difference images to a predictive model, the predictive model comprising a plurality of convolutional networks and an arbitrator; and
determining a clinical parameter for the patient at the arbitrator from respective outputs of the plurality of convolutional neural networks.

17. The method of claim 16, wherein the arbitrator comprises an artificial neural network.

18. The method of claim 17, wherein artificial neural network is a recurrent neural network.

19. The method of claim 16, wherein providing the set of at least two difference images to the predictive model comprises providing a difference image of the set of difference images to each of the convolutional neural networks, each of the plurality of convolutional neural networks receiving a different difference image than each of the other of the plurality of convolutional neural networks.

20. The method of claim 16, further comprising assigning a course of treatment to the subject based on the provided clinical parameter.

* * * * *